Oct. 2, 1951 G. G. LANDIS ET AL 2,569,476
ARC WELDING APPARATUS

Filed Aug. 7, 1944 4 Sheets-Sheet 1

INVENTORS
GEORGE G. LANDIS and
NORMAN J. HOENIE
BY
Oberlin, Limbach & Day
ATTORNEYS Oct. 2, 1951 G. G. LANDIS ET AL 2,569,476
ARC WELDING APPARATUS
Filed Aug. 7, 1944 4 Sheets-Sheet 2
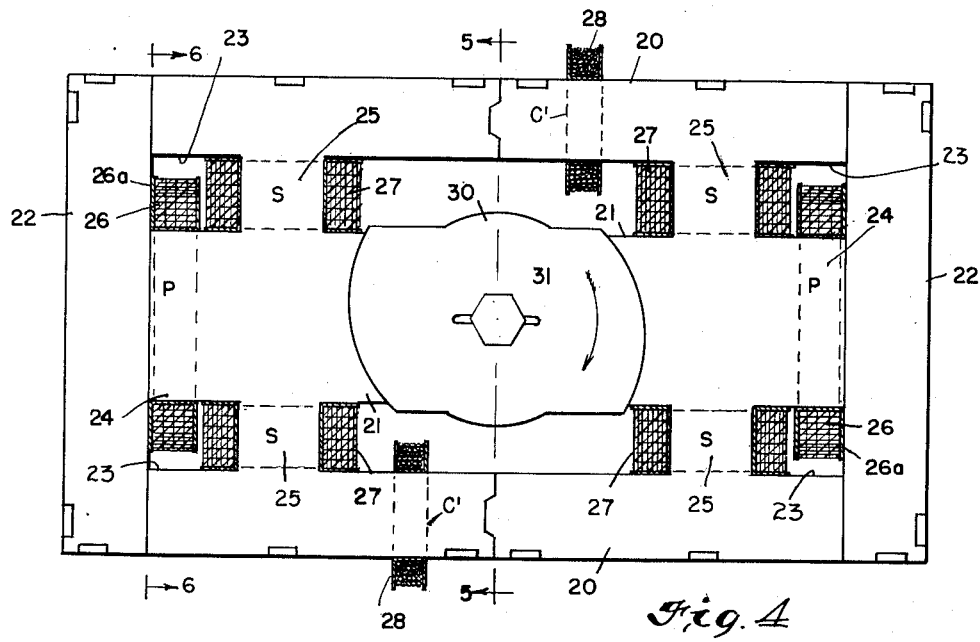
Fig. 4
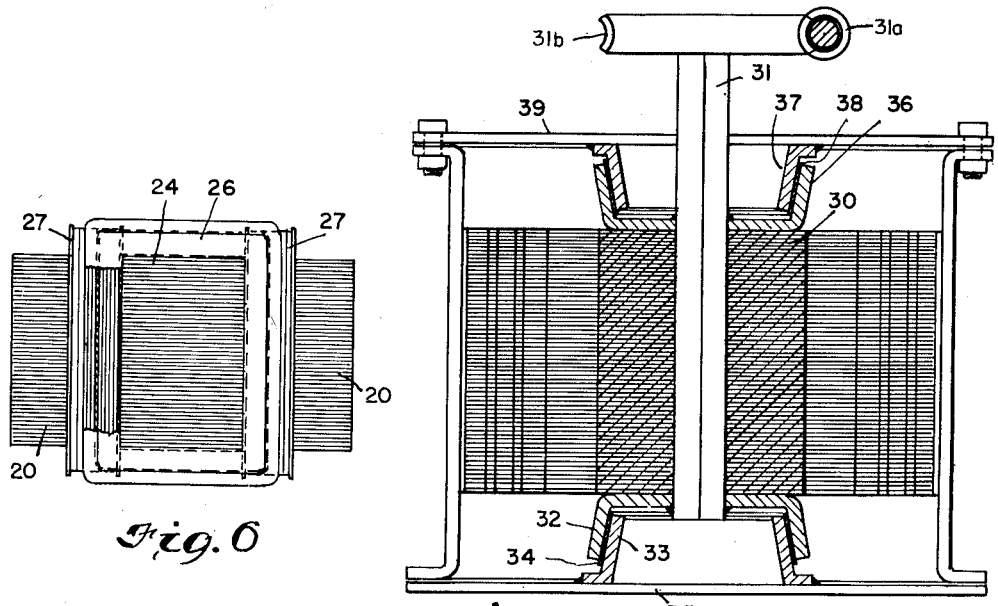
Fig. 6
Fig. 5
INVENTORS
GEORGE G. LANDIS and
NORMAN J. HOENIE
BY
Oberlin, Limbach & Day.
ATTORNEYS Oct. 2, 1951      G. G. LANDIS ET AL      2,569,476
ARC WELDING APPARATUS Filed Aug. 7, 1944      4 Sheets-Sheet 3

INVENTORS
GEORGE G. LANDIS and
BY   NORMAN J. HOENIE

Oberlin, Limbach & Day.
ATTORNEYS

Oct. 2, 1951     G. G. LANDIS ET AL     2,569,476
ARC WELDING APPARATUS
Filed Aug. 7, 1944                                4 Sheets-Sheet 4
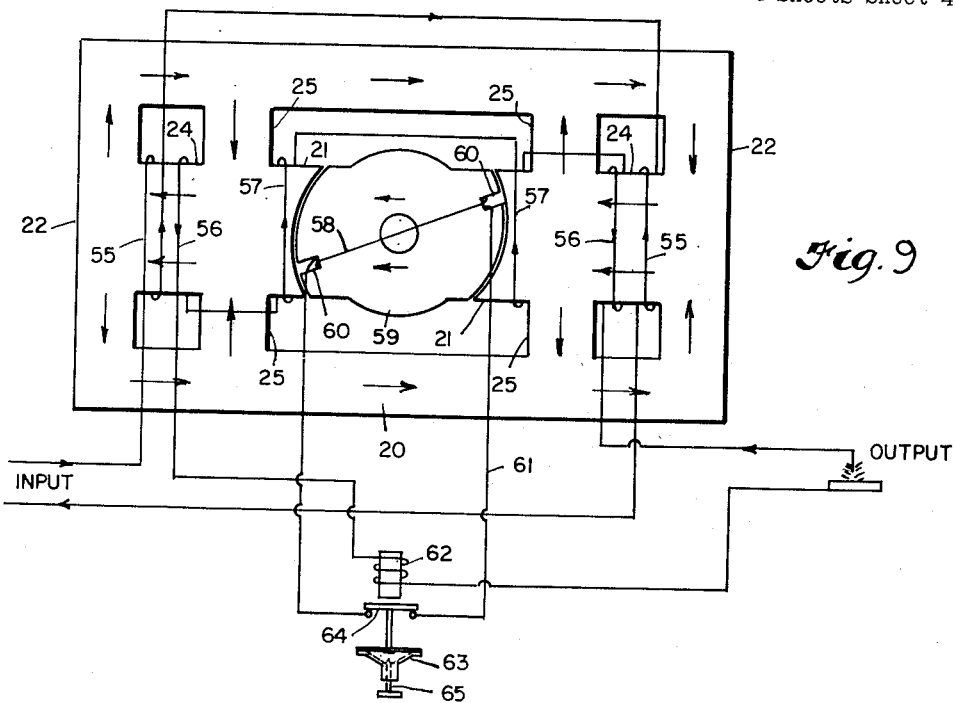
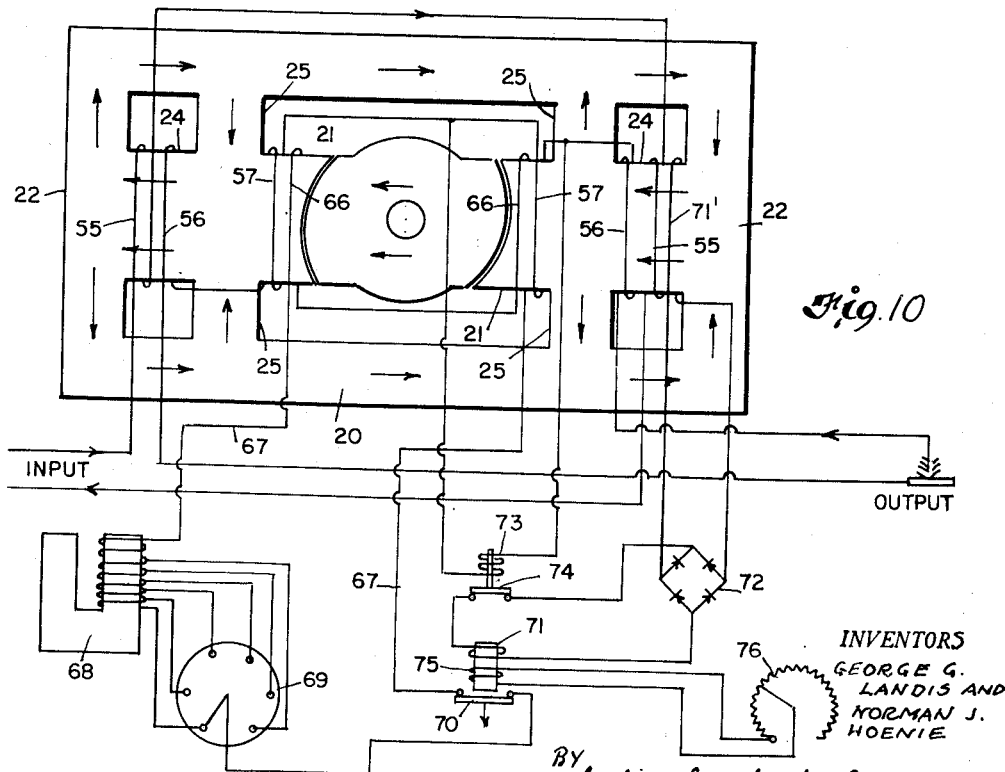
INVENTORS
GEORGE G. LANDIS AND
NORMAN J. HOENIE
BY Oberlin, Limbach & Day ATTYS Patented Oct. 2, 1951

2,569,476

UNITED STATES PATENT OFFICE 2,569,476

ARC WELDING APPARATUS

George G. Landis, South Euclid, and Norman J. Hoenie, Cleveland Heights, Ohio, assignors to The Lincoln Electric Company, Cleveland, Ohio, a corporation of Ohio Application August 7, 1944, Serial No. 548,342

13 Claims. (Cl. 171—242)

The present improvements, relating as indicated to arc welding apparatus, have more particular regard to the provision of a more efficient construction of transformer suitable for use in A. C. welding systems, as well as to the wiring plan or disposition of circuits in such a system.

In U. S. Letters Patent No. 2,299,329 issued to George G. Landis under date of October 20, 1942, there is disclosed a construction of close-coupled transformer wherein the primary and secondary coils are separated at a point within the contour of the main magnetic circuit and a variable magnetic bridge is provided in the area of separation of said windings. In the specific construction illustrated in said patent this bridge takes the form of a rotor of magnetic material suitably mounted within a hollow stator, and means are provided whereby said rotor may be set to occupy various positions about its axis and thus correspondingly vary the current flow in the secondary coil of the transformer, or in other words, the character of the current delivered to the secondary circuit, which in an arc welding system will of course be the main welding circuit.

One object of the present invention is to provide a transformer of the type just described but which will be considerably more efficient in operation.

A further object is to provide a construction for such transformer which will facilitate assembly of the parts thereof and otherwise reduce the cost of manufacture.

A still further object is to provide means whereby the current in the secondary or welding circuit may be automatically varied to meet conditions encountered in the operation of arc welding with an A. C. current, and particularly to permit striking the arc with the short-circuit impedance set at an adjustable predetermined amount below normal and then automatically increasing such impedance to its normal value after the arc is established.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:

Fig. 4 is a view similar to that of Fig. 2 but showing a modified construction of transformer;

Fig. 5 is a vertical section thereof taken on a transverse central plane, as indicated by the line 5—5, Fig. 4;

Fig. 6 is a transverse section on a parallel vertical plane near one end of the transformer as indicated by the line 6—6, Fig. 4;

Figure 7:
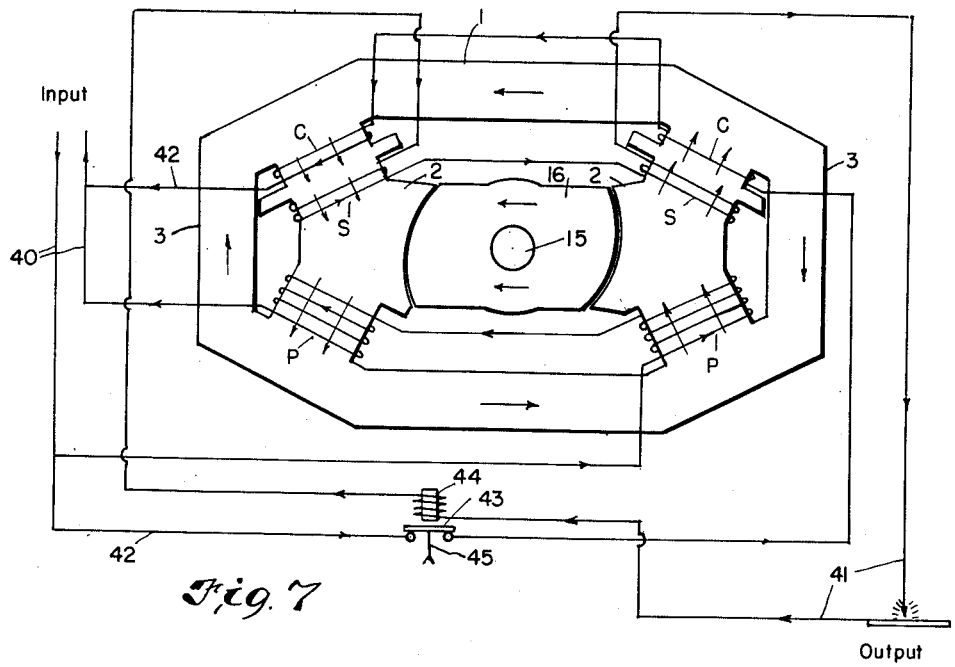
Figure 8:
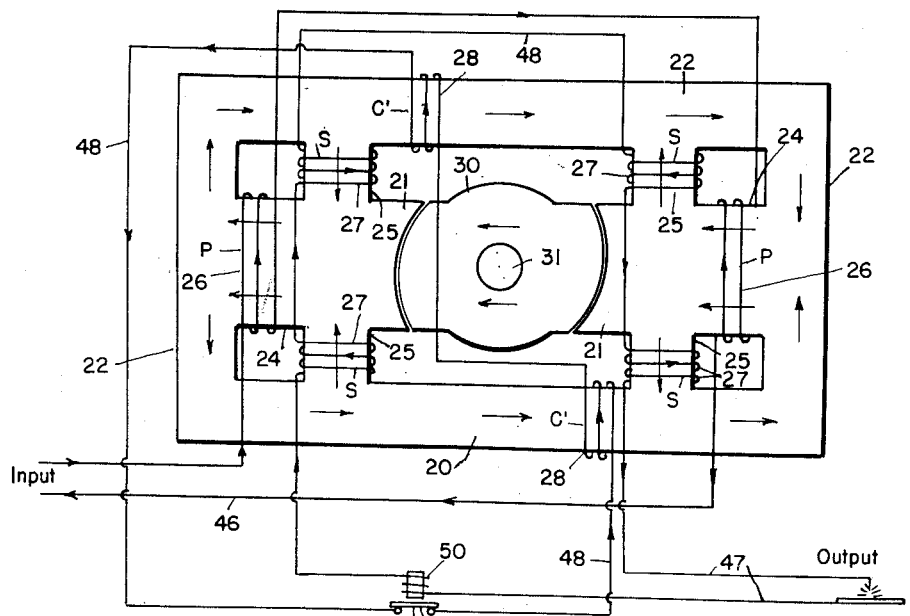

Figs. 7 and 8 are wiring diagrams respectively showing the two illustrated constructions of our improved transformer as included in an arc welding circuit employing A. C. current in accordance with our improved method or process; and Figs. 9 and 10 are wiring diagrams similar to those of Figs. 7 and 8 but illustrating modifications in the arrangement of the transformer windings and control circuits.

The construction of each of the two illustrative forms of our improved transformer will be first described, following which the manner in which such transformer may be incorporated in an A. C. welding circuit will be set forth.

Figure 2:
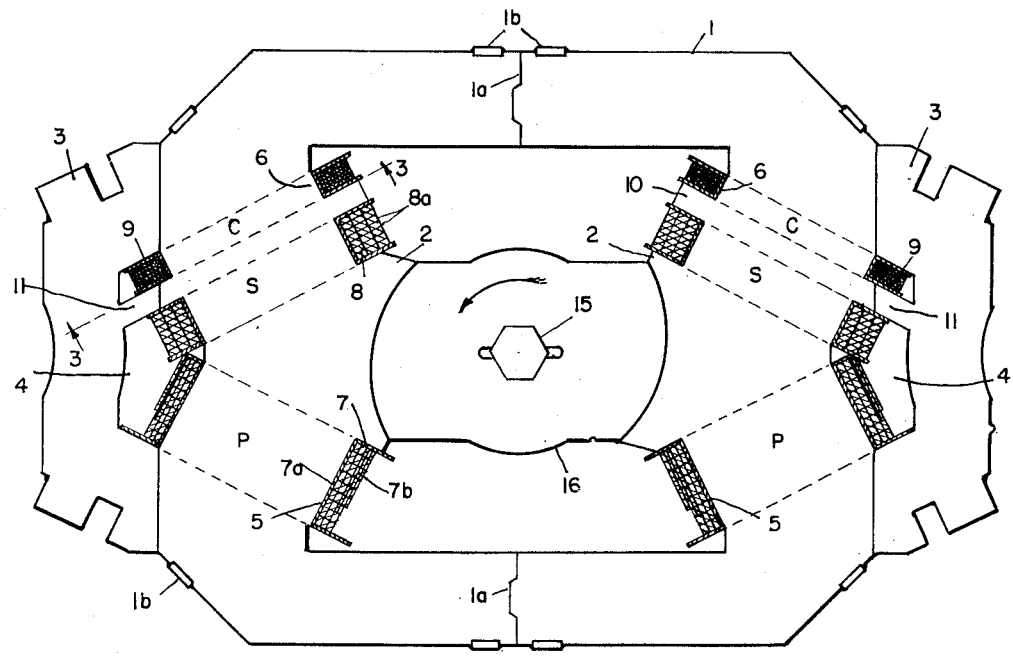
Fig. 2 is a transverse sectional view of such transformer taken on a plane intermediate of its top and bottom, such section being on a somewhat larger scale than Fig. 1 and showing various details of construction not there appearing.
Figure 3:
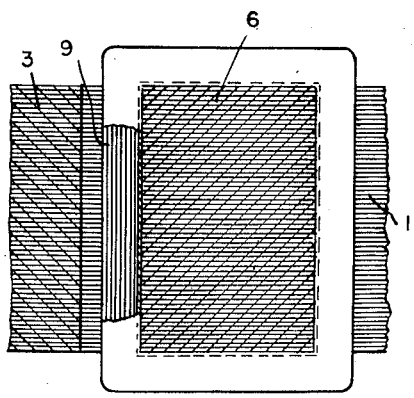
Fig. 3 is a vertical section of a portion of such transformer, the plane of the section being indicated by the line 3—3, Fig. 2.
Figure 1:
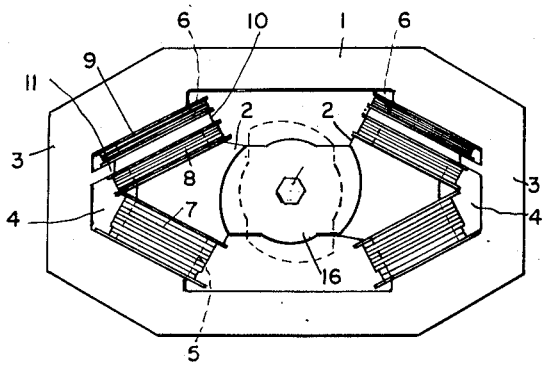
Fig. 1 is a top plan view, more or less diagrammatic in character, of one construction of transformer embodying our present improvements.

Referring to the construction illustrated in Figs. 1, 2 and 3, the laminated stator will be seen to comprise a body 1 of hollow form having two opposed inwardly directed projections 2, 2. Such body also includes an extension 3 at each end which is in effect continuous with the side walls of the main body but is spaced from the ends thereof so as to leave an opening 4 directly back of each of the inwardly directed projections 2.

The portions 5 and 6 of each end of the stator body which lie on the respective sides of the corresponding projection 2 serve to receive and support the primary and secondary coils or windings 7 and 8, the former encircling such portion 5 and the latter such portion 6. In addition, end portion 6 is encircled by a second supplemental primary coil 9 which is slightly spaced from the adjacent secondary coil 8. Projections 10 and 11 from the adjacent end portion of the stator body and from the corresponding extension 3 of such body are interposed between the two coils 8 and 9 and constitute an iron leakage bridge, as will be later explained.

It will be noted that the outer portions of the respective pairs of primary and secondary coils 7 and 8, which pass through the spaces 4 between the stator body 1 and extensions 3 thereof, lie closely adjacent each other, as in a closely coupled transformer, whereas the inner portions of such coils are held in spaced relation by the inwardly directed projections 2 of the stator body, i. e. such portions are substantially separated as in a loosely coupled transformer.

While not limited thereto, as illustrated in Fig. 2 the primary coils or windings 7 preferably comprise two interconnected groups, viz. an inner group 7a consisting of the indicated number of turns of a relatively heavy flat conductor, and an outer group 7b consisting of the indicated number of turns of a relatively lighter flat conductor. Likewise, the secondary coils or windings 8 are preferably formed of a relatively heavy flat conductor 8a similar to that comprised in turns 7a of the primary coils; however, the conductor in this case, as shown, is desirably disposed edgewise to the plane of the coil instead of transversely thereof. The supplemental primary coil or winding 9 will preferably be composed of a suitable number of turns of wire in counterdistinction to the flat conductors used in primary coils 7 and secondary coils 8. All such conductors will of course carry adequate insulation and the coils themselves will in addition be surrounded with insulation on their contacting inner and lateral forces.

Rotatably mounted between projections 2, 2, as by means of an axial spindle 15, is a laminated member 16 that is adapted to form a variable magnetic bridge between said projections. Such member, in other words, is composed of a plurality of closely contacting plates similar to those whereof the stator body 1 is composed; in fact, as will be presently described, they may be conveniently stamped out of the same sheet of metal as are the plates composing the stator. Spindle 15 which carries member 16 may be supported so as to provide for rotative movement of said member in any suitable manner, one preferred mounting being that illustrated in connection with the second form of apparatus (see Figs. 4, 5 and 6) which will be presently described. The rotatable member 16 it will be observed is oblong in form, i. e. longer in one dimension than in the other, so that when, as shown in full lines in Figs. 1 and 2, it is aligned with the inwardly directed projections 2, 2 of the stator body it will close the space therebetween. On the other hand, when rotated in a counterclockwise direction from such position a substantial clearance will be left between the ends of said member and the respective projections. The first of such positions of member 16 will be refererd to hereinafter as its closed position and the second as its open position. Obviously said member may occupy various intermediate positions as well.

In the previously mentioned Patent No. 2,299,320, where a similar rotatable member is employed to constitute a variable magnetic bridge between opposite portions of a stator, the opposed ends of said member and of the projections on the stator body are shown as formed on arcs concentric with respect to the axis of said member. In the present construction, on the contrary, such opposed faces are formed on arcs eccentric with respect to such axis, with the result that immediately upon starting to rotate the member from its closed position, its ends will be slightly separated from the opposed ends of projections 2 instead of remaining substantially in contact therewith until the member is rotated to its open position. As a result, while close fitting contact between the rotative member and the projections is secured in the former's closed position so as to constitute in effect a continuous bridge between the ends of the stator body, such contact is at once broken when the stator is shifted even slightly from its closed position and its function as a variable magnetic bridge thus enhanced.

The parts constituting the stator body 1, including the extensions 3 at each end thereof and the rotatable bridge member 16, are so designed that they may be stamped from a single sheet of a width no greater than that of said body proper. In other words, it will be observed upon referring to Fig. 2, the sheets comprised in said extensions 3 and bridge member 16 may be respectively made from the lateral portions and the center of a sheet having the width indicated. In practice, successive sections of a sheet of proper width will be cut off to provide blanks corresponding with the over-all dimensions of body 1; then by successive stamping operations a central portion of each section corresponding in form to said rotatable member is stamped out, followed by stamping out respective portions on each side of said central portion which enter into the extensions 3. In order to facilitate winding or placement of the primary and secondary coils, the blanks thus stamped to form the stator body are transversely severed along the lines 1a, and the respective half sections that enter into the body after being assembled are welded together as by means of retaining bars 1b, the number and placement of which may vary depending upon the size and general shape of the stator body.

It will be understood that both the primary and secondary coils or windings 7 and 8, as well as the supplemental primary winding 9, will be placed in the position which they respectively occupy in the completed transformer, before the two halves into which the main body of the stator is divided are brought together and also before the end extensions 3 of such stator body are attached. Such primary and secondary windings may be conveniently wound in place around the corresponding portions of the stator body; however, the supplemental primary coil or winding 9 may be made up preliminarily and then slipped into its place over the adjacent half side or arm of the stator body, since the cross-sectional area of the latter is substantially less than the end portion of said body which the coil is designed to encircle when in place.

Referring now to the modified construction of transformer illustrated in Figs. 4, 5 and 6, the body 20 of the transformer, as in the case of the first described construction, is of hollow, generally rectangular, form, having two opposed inwardly directed projections 21, 21. Likewise such body includes an extension 22 at each end, spaced from the corresponding end of the body proper, but instead of enclosing a single opening, two openings 23, 23 are formed by providing the ends of such main body with bridge-like extensions 24, 24, opposite the respective inwardly directed projections 21, 21.

Surrounding each of the bridge-extensions 24 of the stator body is a primary coil or winding 26, and around each end portion 25 of the stator body which lies on the respective sides of each such oppositely directed projection 21 and corresponding extension 24 is placed a secondary coil or winding 27. There will accordingly be four such secondary coils or windings, two adjacent each side of the stator body and disposed in a plane parallel therewith, while the primary windings 26 will be disposed at right angles to such secondary windings. Each such primary winding 26 will desirably be made up, as shown, of two windings, the outer 26a of which is constituted not only of a smaller number of turns, but of a lighter gauge conductor than is the inner or main portion of the coil.

In addition to the primary and secondary windings just described, another coil or winding 28 will also be placed about each of the sides of the stator body, such coils lying at right angles to the adjacent secondary coils 27 and being located nearer one such coil than the other to provide necessary clearance for rotative movement of the bridge member 30. As will more fully appear from the description of the corresponding circuit diagram (Fig. 8), which follows, the coils 28 are included in an independent, self-excited circuit, which is normally closed but is opened upon flow of current through the secondaries of the transformer.

The rotatable bridge member 30, as in the case of previously described bridge member 16, is of laminated construction and is carried as before, for the purpose of rotation, by an axial spindle 31. Furthermore, both the form of said member and the form of its faces which are designed to contact with the inner faces of projections 21, viz. on arcs eccentric with respect to the axis of the member, are the same as in the first described construction of our improved transformer.

In Fig. 5 we illustrate a preferred mounting for the spindle 31 which thus carries the rotatable bridge member 30. As there shown, a cup-shaped shell 32 is attached to the lower end of said spindle, such shell having slightly flaring sides which fit over a complementary shell 33, a layer of insulating material 34 being interposed between their adjacent faces, when necessary. Shell 33 is supported on a transverse bar or plate 35 that forms a part of the frame of the transformer. A similar cup-shaped shell 36 is attached to the spindle directly above the stator body and engages a similar complementary shell 37, a layer of insulating material 38 being interposed as before, and said last-named shell being attached to a bar or plate 39 forming part of the transformer frame. One or both of the bars 35 and 39 will have sufficient resilience or spring so as to retain the corresponding cup-shaped shells 32 and 36 in frictional engagement with the opposed shells 33 and 37, the friction being sufficient to prevent rotation of the spindle except by application of outside force. In other words, the spindle with the bridge member carried thereby will remain in whatever angular position it may be given irrespective of magnetic forces developed within the transformer which tend to rotate said bridge member. Any suitable means may be provided for rotating the spindle and bridge member when desired, such as a hand wheel (not shown) connected by means of reduction gearing, to the upper end of the spindle. As illustrated such reduction gearing takes the form of a worm 31a and worm gear 31b. Such adjustment may obviously be made with any degree of refinement desired, since the rotor will stay wherever it is put; furthermore there is no tendency to chatter or strain the adjusting means.

As previously explained, a similar mounting to that just described will desirably be used in connection with the spindle 15 in the case of the previously described construction of our transformer.

It will be noted that in this last described form of our transformer, while the primary and secondary coils may appear to be differently disposed from that found in the first described form, such coils nevertheless occupy the same relation to each other and to the inward projections of the stator. Thus if we regard the primary coil at the left of Fig. 4 and the uppermost of the adjacent secondary coils, it will be seen that the inner portions of said coils are held in spaced relation by the corresponding projection 21 while the outer portions of said coils lie closely adjacent each other. The same relation will be seen to exist between said primary coils and the lowermost of the adjacent secondary coils. This is likewise true of the primary coils shown at the right of said Fig. 4 and the two adjacent secondary coils.

The manner in which the first described construction of transformer, viz. that illustrated in Figs. 1-3 inclusive, may be incorporated in an arc welding circuit is illustrated in the wiring diagram Fig. 7. In this figure the parts of the transformer are shown more or less diagrammatically, but the same reference numerals are applied to such parts as in the previously given description. As there shown, the primary coils of the transformer, marked "P" for convenient identification, are connected in series in the usual manner with the supply line 40, marked "In-put," and the secondary coils, marked "S," are similarly connected in series in the "Output" circuit 41 by which the arc welding operation is performed. The supplemental coils, marked "C," which are disposed alongside the secondary coils are included in series in a shunt circuit 42 off the main in-put circuit 40 which is controlled by a switch 43 that is normally closed but is adapted to be operated by solenoid 44 included in the secondary circuit 41. A time delay device 45 is associated with such switch so that the opening of the latter may be regulated to follow by a short interval the closing of the welding circuit which such secondary circuit in effect constitutes. In other words, for such short interval following striking of the arc, the supplemental coils C will remain in circuit and induce an additional flow or surge of current through the secondary coils and thus through such welding circuit. The time interval in question will be just long enough to permit establishment of the arc, following which the action of the solenoid 43 will be effective to interrupt the circuit 42 through such supplemental coils.

Fig. 8 illustrates, in a manner similar to that of Fig. 7, an arc welding circuit wherein the welding current is supplied by a transformer of the modified construction illustrated in Figs. 4-6 inclusive. As before, the parts of the transformer are shown diagrammatically only but are designated by the same numerals as in such previously described figures. As in the previously described circuit arrangement, the primary coils, additionally marked with the letter "P" for convenient identification, are connected in series with the main or in-put circuit 46, and the secondary coils S are connected in series with the welding or out-put circuit 47. However, the supplemental coils C' instead of being connected in series in a shunt circuit off the main or input circuit are connected in series in a closed circuit 48 so that these coils in effect are adapted to induce additional secondary current upon flow of current through the primary coils. As in the case of the shunt circuit 42 in which supplemental coils C are included in the first diagram, so the circuit 48 in which the supplemental coils C' are included is normally closed by a switch 49 which is adapted to be opened by solenoid 50 included in the arc welding or out-put circuit 47. Likewise, as before, there is associated with such switch 49 a time delay device 51 so that a short interval will occur after the arc has been established before circuit 48 is interrupted.

In both Figs. 7 and 8 the lines of flux in the transformer stator are indicated by arrows, and with the rotatable bridge member in the closed position shown in said figures, lines of flux will similarly pass across the latter. In this position of the bridge or rotor the transformer will give a minimum out-put. However, if the rotor be rotated from such closed position to full open position the air gap between the circuits of the rotor and the projections of the stator between which it is mounted may be increased to any desired value, the short circuit current in the secondary winding being at a maximum in full open position of such rotor. Intermediate positions of the rotor will of course provide for a corresponding variation in the short circuit current in the secondary winding. As previously explained, due to the fact that the opposed faces of such bridge member or rotor and the stator projections between which it is mounted are formed on arcs eccentric with respect to the axis of the rotor, such faces may be brought into close contact when the rotor is in its closed position, but such contact will be immediately broken and an air gap of increasing extent provided as the rotor is moved from such closed position to its full open position.

In the modified constructions respectively illustrated in Figs. 9 and 10, the stator body is of the same form as that shown in Figs. 4 and 8. The same reference numerals have accordingly been applied to corresponding parts and so far as such stator body is concerned the previously given description will apply.

However, as indicated, a somewhat different arrangement of the transformer windings and control circuits is utilized in these modifications. Thus, not only are the primary windings 55 placed on the bridge-extensions 24 of the stator body, as before, but the secondary windings 56, as well. Furthermore, an additional winding 57, which serves as a reactor is connected in series with each such secondary, being placed upon the inwardly directed projection 21 that corresponds with the extension 24 upon which such secondary is placed.

A different disposition is also made of the surge coil or winding 58, which it will be noted, in the case of Fig. 9, is carried by the rotatable bridge member 59 instead of being placed on the side members of the stator body. To permit such different placement of the surge coil, the rotor is formed with recesses or notches 60, in which the coil is received, such recesses being so located that the coil is disposed at an angle to the median line of the rotor. As a result, the coil will lie at a corresponding angle to the longitudinal central plane of the transformer as a whole in the normal or closed position of the rotor, such angle being increased upon rotation of the latter to its open position.

The circuit which includes the supplemental or surge coil 58, is an independent circuit 61 as before, and is controlled by the welding circuit through a relay 62 in the same manner as is the circuit 48 which includes coils 28 in construction illustrated in Figs. 4 and 8. However, the time-delay device 63 associated with the relay switch 64 in circuit 61, includes an air dash-pot or diaphragm, the movement of which may be regulated by an adjustable air vent valve 65. The setting of such valve will accordingly determine the time delay in the operation of the relay.

In the further modified construction illustrated in Fig. 10, the disposition of primary, secondary and reactor windings on the stator body is the same as just described in connection with Fig. 9 However, instead of the single surge coil 58, carried by the rotatable bridge member, two supplemental coils 66 are employed, one being placed on each inwardly directed projection 21 of the stator body adjacent the corresponding reactor coil or winding. In other words such surge coils are wound directly around the magnetic circuit that carries such reactor coils. Moreover, the circuit 67, which includes these supplemental or surge coils, also includes a separate reactor 68 provided with a top switch 69, whereby said reactor may be tapped for various values to correspondingly vary the value of the current in the surge circuit, such value increasing as the number of turns on the reactor 68 included in the circuit is decreased.

In the construction illustrated in Fig. 10, the supplemental or surge circuit 67 is controlled as before by a time delay switch 70, but somewhat more elaborate means are provided for regulating the action of said switch. Thus the relay 71 which operates the latter is actuated by low voltage current shown as being secured from a small secondary winding 71' to a rectifier 72, although any other source of similar current may be utilized. A second relay 73 in a circuit, connected in shunt with the secondary windings 57, is adapted to open a normally closed switch 74 in such low voltage circuit, whenever current is delivered to "Out-put," e. g. wherever the arc is stuck in an arc welding operation. As a result, the relay 71 is de-energized and the switch 70 allowed to open subject to the action of the time delay 70 As a means for varying such action, in a manner similar to that effected by adjusting valve 65, we here use electrical adjusting means comprising second winding 75 in relay 71, which is shorted through a rheostat 76, whereby the flow of current in such short circuit may be varied.

It will accordingly be seen that in the apparatus illustrated in Fig. 10, there is provided not only adjustable means for varying the flow of current through the supplemental or surge coils, but also for adjusting the time delay relay to cut out said coils after a selected predetermined interval.

It is noted that claims to certain of the features herein disclosed have been divided out of application Serial No. 543,648, filed July 6, 1944 (now Patent No. 2,465,596, dated March 29, 1949, of which this application is a continuation in part.

Other modes of applying the principle of our invention may be employed instead of the one explained, change being made as regards the means and the steps herein disclosed, provided those stated by any of the following claims or their equivalent be employed.

We therefore particularly point out and distinctly claim as our invention:

1. In a transformer, the combination of a stator body of hollow form having an inwardly directed pole-providing projection, a movable member adapted to cooperate with said projection to form a variable magnetic bridge, an extension of such stator body enclosing a space opposite such projection, and primary and secondary windings encircling said stator adjacent such projection, said windings lying in part in the space thus provided and said extension together with either adjacent lateral portion of said body providing a flux path substantially equivalent to that provided by said body where encircled by said windings.

2. In a transformer, the combination of a stator body of hollow form having two opposed inwardly directed pole-providing projections, a movable member adapted to cooperate with said projections to form a variable magnetic bridge, an extension of such stator body enclosing a space opposite each such projection, and primary and secondary windings encircling said stator adjacent each such projection, said winding lying in part in the spaces thus provided and said extensions together with the portions of said body lying between such projections providing flux paths substantially equivalent to that provided by said body where encircled by said windings.

3. In a transformer, the combination of a stator body, primary and secondary windings on said stator body, a movable member adapted to cooperate with a portion of said stator body to form a variable magnetic bridge, and coacting friction elements, one fixed and the other carried by said member, said elements constituting a brake whereby said member is retained against movement by the magnetic force induced by said windings, said member being movable by externally applied force in excess of such magnetic force.

4. In a transformer, the combination of a stator body, primary and secondary windings on said stator body, a rotatable member adapted to cooperate with a portion of said stator body to form a variable magnetic bridge, and coacting friction elements, one fixed and the other carried by said member, said elements constituting a brake whereby said member is retained against rotation by the magnetic force induced by said windings, said member being rotatable by externally applied force in excess of such magnetic force.

5. In a transformer, the combination of a stator body of hollow form having two inwardly directed projections, primary and secondary windings encircling said stator body adjacent such projections, a rotatable member within said body adapted to form a variable magnetic bridge between said projections, and coacting friction elements, one fixed and the other carried by said member, said elements constituting a brake whereby said member is retained against rotation by the magnetic force induced by said windings, said member being rotatable by externally applied force in excess of such magnetic force.

6. In a transformer, the combination of a stator body of hollow form having an inwardly directed projection and a corresponding outwardly directed projection, a movable member adapted to cooperate with said inwardly directed projections to form a variable magnetic bridge, a primary winding encircling said outwardly directed projection, and secondary windings encircling such stator body, one on each side of said projection, the inner portions of said secondary windings being held in spaced relation by said inwardly directed projection and the outer portions thereof lying closely adjacent to said primary winding.

7. In a transformer, the combination of a stator body of hollow form having two opposed inwardly directed projections and two corresponding outwardly directed projections, a movable member adapted to cooperate with said inwardly directed projections to form a variable magnetic bridge, a primary winding encircling each of said outwardly directed projections, and secondary windings encircling said stator body, one on each side of each of said projections, the inner portions of said secondary windings being held in spaced relation, and the outer portions thereof lying closely adjacent to the corresponding primary winding.

8. In a transformer, the combination of a stator body of hollow form having two opposed inwardly directed projections, a movable member adapted to cooperate with said inwardly directed projections to form a variable magnetic bridge, an extension of said stator body enclosing a space opposite each such projection, each such space being divided by a bridge aligned with a corresponding projection, a primary winding encircling each of said bridges, and secondary windings encircling said stator body, one on each side of each of said projections, the inner portions of said secondary windings being held in spaced relation by said projections and the outer portions thereof lying closely adjacent to the corresponding primary winding.

9. In a transformer, the combination of a stator body of hollow form having two opposed inwardly directed projections, an extension of said stator body enclosing a space opposite each such projection, each such space being divided by a bridge aligned with a corresponding projection, a primary winding encircling each of said bridges, secondary windings encircling said stator body, one on each side of each of said projections, the inner portions of said secondary windings being held in spaced relation by said projections and the outer portions thereof lying closely adjacent to the corresponding primary winding, and a rotatable member within said body adapted to form a variable magnetic bridge between said inwardly directed projections.

10. In apparatus of the character described having primary and secondary windings, the combination of a stator body of hollow form having an inwardly directed projection, three windings on said projection, at least one being the transformer secondary and encircling said projection, a rotatable member within said body adapted to form a variable magnetic bridge in conjunction with said projection, and a surge coil disposed so as to intersect the flux path through said projection and member irrespective of the position of the latter.

11. In a transformer or like electrical apparatus, the combination of a stator body of hollow form having an inwardly directed projection, an extension of such stator body enclosing a space opposite said projection, primary and secondary windings encircling such stator adjacent such projection, said windings lying in part in the space thus provided, and a movable member adapted to co-operate with said projection to form a variable magnetic bridge.

12. In a transformer or like electrical apparatus, the combination of a stator body of hollow form having two opposed inwardly directed projections, an extension of such stator body enclosing a space opposite each such projection, primary and secondary windings encircling said stator adjacent each such projection, said windings lying in part in the spaces thus provided, and a variable magnetic bridge between said projections.

13. In a transformer or like apparatus, the combination of a stator body of hollow form having two opposed inwardly directed projections, an extension of such stator body enclosing a space opposite each such projection, primary and secondary windings encircling said stator adjacent each such projection, said windings lying in part in the spaces thus provided, and a rotatable member within said body adapted to form a variable magnetic bridge between said projections.

GEORGE G. LANDIS.
NORMAN J. HOENIE.

REFERENCES CITED

The following references are of record in the file of this patent:

UNITED STATES PATENTS

| Number | Name | Date |
|---|---|---|
| 735,103 | Hull | Aug. 4, 1903 |
| 1,454,005 | Wenzel | May 1, 1923 |
| 1,699,142 | Hendricks | Jan. 15, 1929 |
| 1,943,463 | Von Ohlsen et al. | Jan. 16, 1934 |
| 2,136,798 | Lucas | Nov. 15, 1938 |
| 2,379,417 | Conrad | July 3, 1945 |
| 2,391,875 | Boucher | Jan. 1, 1946 |
| 2,395,881 | Klemperer | Mar. 5, 1946 |
| 2,435,214 | Haug | Feb. 3, 1948 |

FOREIGN PATENTS

| Number | Country | Date |
|---|---|---|
| 316,575 | Italy | Apr. 10, 1934 |
| 441,751 | Great Britain | Jan. 24, 1936 |